United States Patent [19]

Ishikawa

[11] Patent Number: 5,343,299
[45] Date of Patent: Aug. 30, 1994

[54] TELEVISION SIGNAL CONVERTING APPARATUS

[75] Inventor: Hisashi Ishikawa, Yokohama, Japan

[73] Assignee: Canon Kabushiki Kaisha, Tokyo, Japan

[21] Appl. No.: 999,460

[22] Filed: Dec. 29, 1992

Related U.S. Application Data

[63] Continuation of Ser. No. 686,585, Apr. 17, 1991, abandoned.

[30] Foreign Application Priority Data

Apr. 26, 1990 [JP] Japan .................. 2-108912

[51] Int. Cl.⁵ ............................................. H04N 7/01
[52] U.S. Cl. ..................... 348/445; 348/458
[58] Field of Search .................. 358/140, 11, 138, 141; H04N 7/01

[56] References Cited

U.S. PATENT DOCUMENTS 4,766,494  8/1988  Doyle ................... 358/140
5,029,001  7/1991  Tanaka .................. 358/140

Primary Examiner—Victor R. Kostak
Attorney, Agent, or Firm—Robin, Blecker, Daley & Driscoll

[57] ABSTRACT

An apparatus for converting a first television signal into a second television signal of a fewer number of horizontal scanning lines than in the first television signal, in which a horizontal scanning line signal corresponding to the horizontal scanning line of the second television signal is formed from horizontal scanning line signals corresponding to the horizontal scanning lines of an even number, positioned mutually close on the image plane, among the plural horizontal scanning lines of the first television signal, while a horizontal scanning line signal corresponding to the horizontal scanning line of the second television signal is formed from horizontal scanning line signals corresponding to the horizontal scanning lines of an odd number, positioned mutually close on the image plane, among the plural horizontal scanning lines of the first television signal, and these formed signals are alternately selected by every vertical synchronization period. Thus a precise and stable conversion of television signals is realized without deterioration in the image quality.

12 Claims, 4 Drawing Sheets

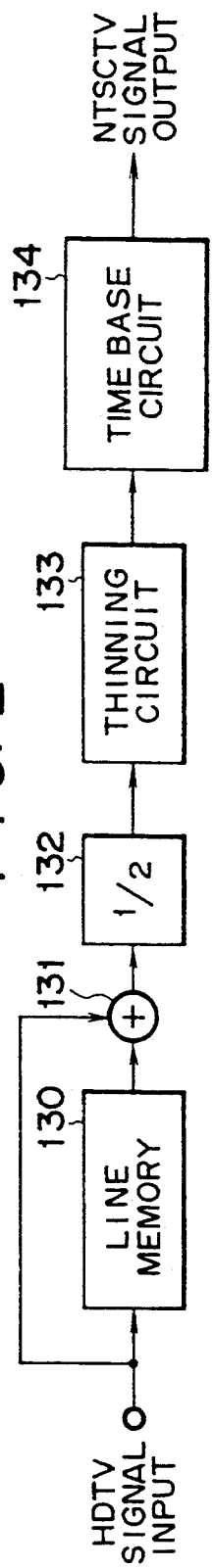
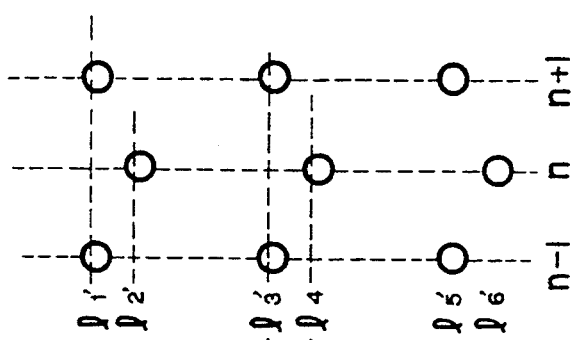
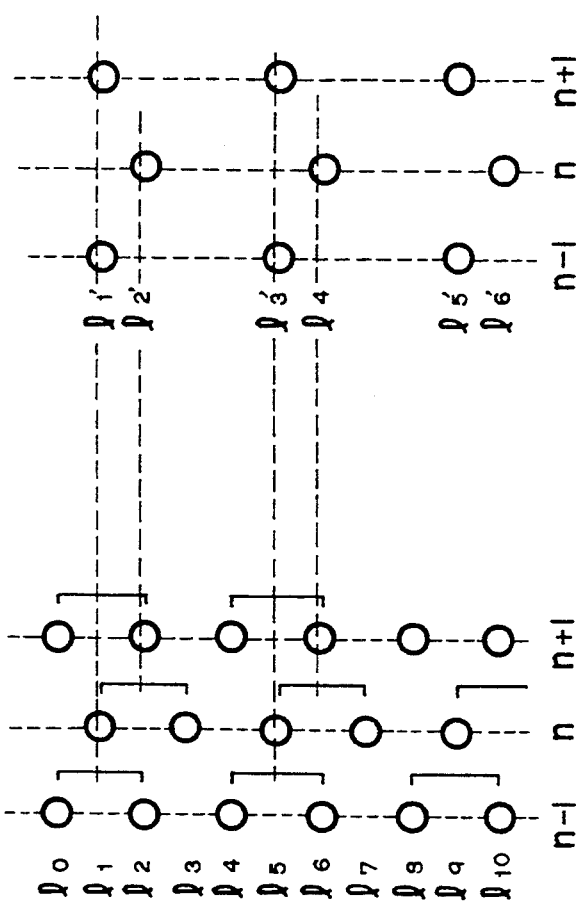

TELEVISION SIGNAL CONVERTING APPARATUS

This is a continuation of prior application Ser. No. 686,585, filed Apr. 17, 1991, now abandoned.

BACKGROUND OF THE INVENTION

1. Field of the Invention

The present invention relates to a television signal converting apparatus for converting the television signal of a certain system into that of another system.

2. Related Background Art

For a conversion of the television signal of a high definition television system, such as of so-called high-vision system (hereinafter called HDTV signal) into the television signal with a fewer number of scanning lines, such as of the NTSC system (hereinafter called NTSCTV signal), there has already been proposed a television signal converting apparatus of the structure shown in FIG. 1.

FIG. 1 is a schematic block diagram of a conventional television signal converting apparatus, in which the luminance signal Y and the color difference signals $P_R$, $P_B$ of the HDTV signal are entered through terminals 100, 101, 102 and converted in a matrix circuit 103 into R, G and B signals. Said R, G and B signals obtained from the matrix circuit 103 are respectively converted into digital signals by A/D converters 104, 105, 106, then subjected to a conversion in the aspect ratio from 16:9 based on the HDTV signal to 4:3 based on the NTSCTV signal in aspect ratio conversion circuit 107, 108, 109, then to a conversion of number of scanning lines from 1,125 lines based on the HDTV signal to 525 lines based on the NTSCTV signal in scanning line number conversion circuits 111, 112, 113, then converted into analog signals by D/A converters 118, 119, 120, further limited in bandwidth by low-pass filters 121, 122, 123 and supplied to an NTSC encoder 124.

The luminance signal Y of the HDTV signal, entered from the input terminal 100, is also supplied to a synchronization separation circuit 110 for separating a synchronization signal based on the HDTV signal, which is converted in a synchronization conversion circuit 117 into a synchronization based on the NTSCTV signal and supplied to the above-mentioned NTSC encoder 124.

The NTSC encoder 124 encodes the entered R, G, B and synchronization signals into an NTSCTV signal, which is released from an output terminal 125.

Each of the scanning line number conversion circuits 111, 112, 113 shown in FIG. 1 is so composed, for simplifying the circuitry, as to form the signal of a scanning line of NTSCTV signal by averaging the signal of two scanning lines of HDTV signal, as shown in a block diagram of FIG. 2. The entered HDTV signal is delayed by a horizontal scanning period in a line memory 130 and supplied to an adder 131 which adds the entered HDTV signal and the delayed HDTV signal supplied from the line memory 130. Then a ½ multiplying circuit 132 multiplies a coefficient ½ to achieve averaging of the HDTV signal corresponding to two adjacent scanning lines on the image frame. This averaged HDTV signal is skipped every other line by a thinning circuit 133 to obtain 525 horizontal scanning lines corresponding to the NTSCTV signal, and is 10 then subjected to the expansion of time based in a time base expansion circuit 134 in such a manner that the horizontal scanning period matches that of the NTSCTV signal. The conversion of scanning lines is thus completed.

However, in the above-explained scanning line conversion of the HDTV signal into the NTSCTV signal in the conventional apparatus shown in FIG. 1, since a horizontal scanning line of the NTSCTV signal is obtained by averaging the signals of two horizontal scanning lines of the HDTV signal, the horizontal scanning lines obtained after such conversion do not constitute a proper interlace structure on the image frame as will be explained in the following, so that the image is distorted in the vertical direction on the display frame.

FIGS. 3A and 3B illustrate the function of the scanning line number conversion circuit shown in FIG. 1. FIG. 3A shows the structure of horizontal scanning lines of the HDTV signal before the conversion of number of scanning lines, seen from a side of the image frame, and FIG. 3B shows the structure of the horizontal scanning lines of the NTSCTV signal after said conversion.

For example, if scanning lines $l_0$ and $l_2$ in an $(n-1)$-th field, shown in FIG. 3A, are averaged to generate a scanning line $l_1'$ shown in FIG. 3B, said converted scanning line $l_1'$ is positioned, on the image frame, at the center of the scanning lines $l_0$ and $l_2$, namely at the position of the scanning line $l_1$. Similarly a horizontal scanning line obtained from the scanning lines $l_1$ and $l_3$ of the n-th field is at the position of the scanning line $l_2$ on the image frame. Consequently the horizontal scanning lines on the image plane after scanning line conversion are positioned as shown in FIG. 3B, and are equally distanced in each field image, but, in a frame image composed of two fields, for example of $(n-1)$-th field and n-th field, the horizontal scanning lines are no longer equally distanced, so that the interlaced display in this state results in an image distortion in the vertical direction.

SUMMARY OF THE INVENTION

An object of the present invention is to provide a television signal converting apparatus capable of resolving the above-mentioned drawbacks.

Another object of the present invention is to provide a television signal converting apparatus capable of converting the television signal without deterioration in the image quality.

In an aspect of the present invention, the foregoing objects can be attained by a television signal converting apparatus for converting a first television signal into a second television signal having horizontal scanning lines of a number smaller than that of said first television signal, comprising:

first, horizontal scanning line signal forming means for forming a horizontal scanning line signal corresponding to the horizontal scanning line of the second television signal, from horizontal scanning line signals corresponding to the horizontal scanning lines of an even number, positioned mutually close on the image plane, among the plural horizontal scanning lines of the first television signal;

second, horizontal scanning line signal forming means for forming a horizontal scanning line signal corresponding to the horizontal scanning line of the second television signal, from horizontal scanning line signals of an odd number, positioned mutually close on the image plane, among the plural horizontal scanning lines of the first television signal; and horizontal scanning signal output means for alternately releasing, in every vertical synchronization period, the horizontal scanning line signal released from said first horizontal scanning line signal forming means and the horizontal scanning line signal released from said second horizontal scanning line signal forming means.

Still another object of the present invention is to provide a television signal converting apparatus capable of precise and stable conversion of the television signal.

In another aspect of the present invention, the foregoing object can be attained by an apparatus for converting a first television signal into a second television signal having horizontal scanning lines of a number smaller than that of the first television signal, comprising:

horizontal scanning line number converting means for forming and releasing, during a first field period, a horizontal scanning line signal corresponding to the horizontal scanning line of the second television signal from horizontal scanning line signals corresponding to the horizontal scanning lines of an even number positioned mutually close on the image plane among the plural horizontal scanning lines of the first television signal, and, during a second field period, a horizontal scanning line signal corresponding to the horizontal scanning line of the second television signal from horizontal scanning lines of an odd number positioned mutually close on the image plane among the plural horizontal scanning lines of the first television signal;

thinning-out processing means for applying a thinning-out process to the plural horizontal scanning line signals constituting a television signal converted by said horizontal scanning line converting means; and time base correction means for correcting the time base of the plural horizontal scanning line signals constituting the television signal processed by said thinning-out processing means in such a manner that said time base corresponds to the horizontal scanning period corresponding to said second television signal.

Still other objects of the present invention, and the features thereof, will become fully apparent from the following detailed description of the embodiments, which is to be taken in conjunction with the attached drawings.

BRIEF DESCRIPTION OF THE DRAWINGS

FIG. 2 is a detailed block diagram of a scanning line number converting circuit shown in FIG. 1;

FIGS. 3A and 3B are views showing the function of the scanning line number converting process in the scanning line number converting circuit shown in FIG. 2;

DETAILED DESCRIPTION OF THE PREFERRED EMBODIMENTS

Now the present invention will be clarified in detail by a television signal converting apparatus constituting an embodiment of the present invention.

Figure 1:
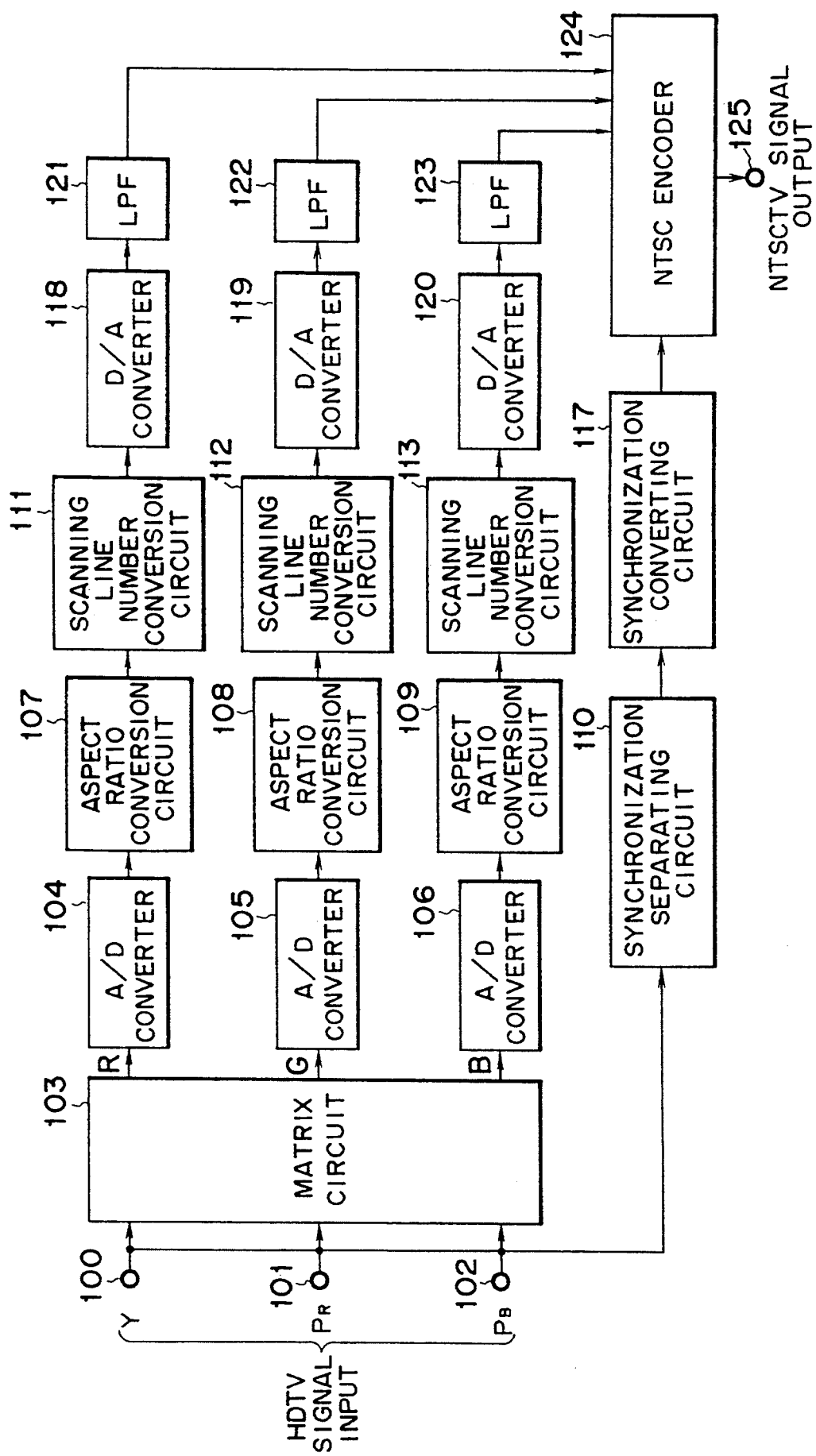
FIG. 1 is a schematic block diagram of a conventional television signal converting apparatus.

The block structure of the television signal converting apparatus of the present embodiment will not be explained since it is similar to that already explained in relation to FIG. 1, and the following description will concentrate on the structure and function of a scanning line number converting circuit constituting the essential part of the present invention. 1 The scanning line number converting circuit of the present embodiment is provided with identical circuits respectively for the R, G and B signals, one of which will be explained in the following.

Figure 4:
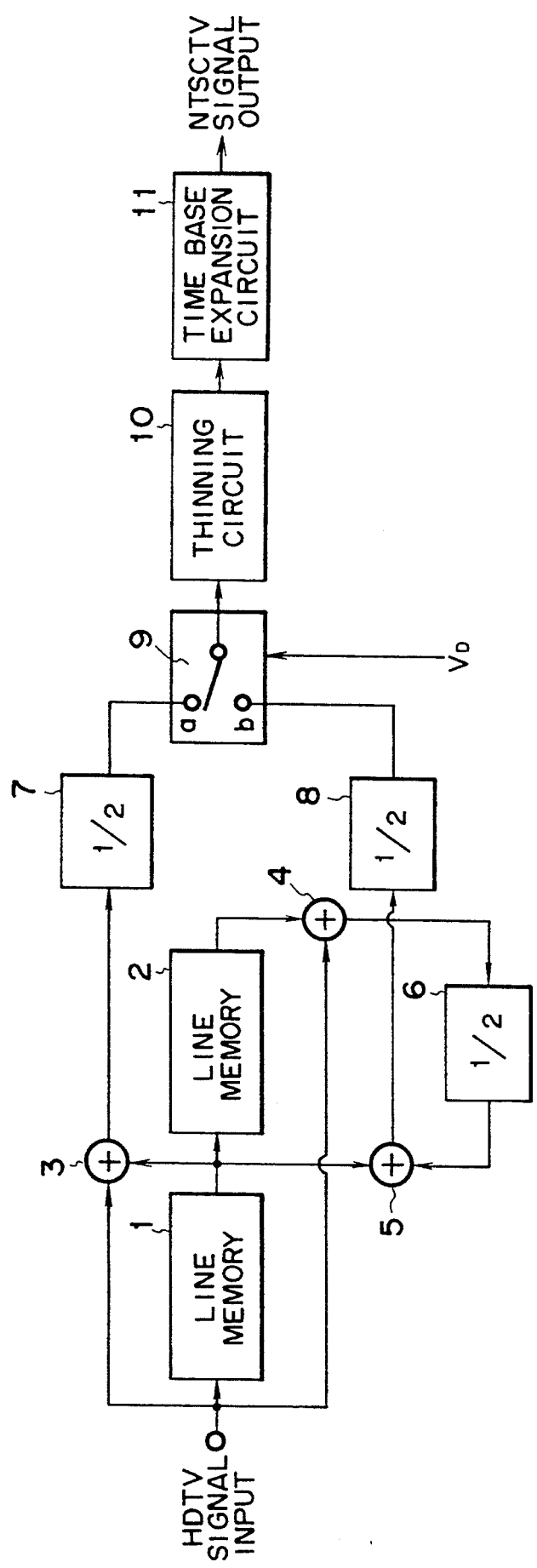
FIG. 4 is a detailed block diagram of a scanning line number converting circuit in a television signal converting apparatus constituting an embodiment of the present invention.

FIG. 4 is a block diagram of the scanning line number converting circuit of the present invention, wherein shown are line memories 1, 2; adders 3, 4, 5; ½ multiplying circuits 6, 7, 8; a selector switch 9; a thinning circuit 10; and a time base expansion circuit 11.

The HDTV signal supplied from the aspect ratio conversion circuit shown in FIG. 1 to the scanning line number conversion circuit is delayed in line memories 1, 2 respectively by a horizontal scanning period. Said HDTV signal is also supplied to the adders 3, 4. In said adder 3, the HDTV signal is added to the HDTV signal of the preceding horizontal scanning period supplied from the line memory 1, then multiplied by ½ in the ½ multiplying circuit 7 and supplied to the terminal a of the selector switch 9.

The entered HDTV signal is added, in the adder 4, to the HDTV signal of the second preceding horizontal scanning period supplied from the line memory 2, then multiplied by ½ in the ½ multiplying circuit 6, then added to the HDTV signal of the immediately preceding horizontal scanning period supplied from the line memory 1, then multiplied by ½ in the ½ multiplying circuit 7 and supplied to the terminal a of the selector switch 9.

The signal selector switch 9 effects switching operation of every field period according to a vertical synchronization signal $V_D$, in such a manner as to select, for example, the terminal a in an (n−1)-th field period, then the terminal b in an n-th field period, and the terminal a in an (n+1)-th period. The signal released from said selector switch 9 is skipped every other line in the thinning circuit 10 in such a manner that a frame contains 525 horizontal scanning lines according to the NTSCTV signal, and is then subjected to the time base expansion in the time base expansion circuit 11 in such a manner that the horizontal scanning period matches that of the NTSCTV signal, whereby the scanning line conversion process is completed.

In the following there will be explained the function of the structure shown in FIG. 4. In the following description it is assumed, for the convenience of explanation, that the selector switch 9 is connected to the terminal a in the (n−1)-th and (n+1)-th field periods, and to the terminal b in the n-th field period.

Figures 5A, 5B:
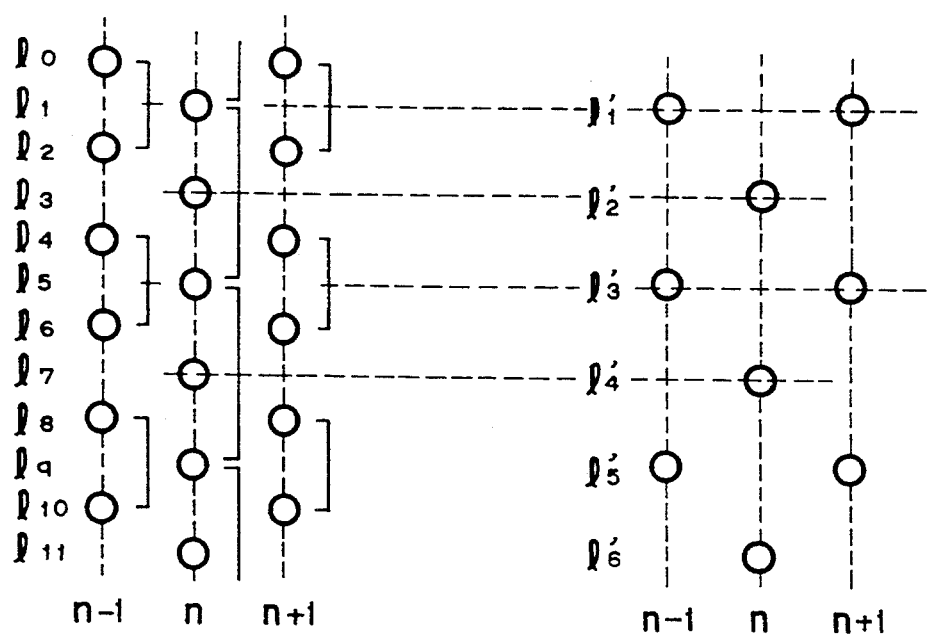
FIGS. 5A and 5B are views showing the function of the scanning line number converting process in the scanning line number converting circuit shown in FIG. 4.

FIGS. 5A and 5B are views showing the mode of scanning the line number conversion in the scanning line number conversion circuit in the television signal converting apparatus embodying the present invention, wherein FIG. 5A shows the scanning lines prior to the scanning line number conversion, seen from the side of the image plane, while FIG. 5B shows those after the scanning line number conversion.

In the (n−1)-th and (n+1)-th field periods, in which the selector switch 9 is connected to the terminal a, the conversion of number of the scanning lines is achieved by replacing a horizontal scanning line $l_1$ by a horizontal scanning line $l_1'$ obtained by averaging the horizontal scanning lines $l_0$ and $l_2$.

On the other hand, in the n-th field period, in which the selector switch 9 is connected to the terminal b, a horizontal scanning line is obtained by averaging a horizontal scanning line of the immediately preceding horizontal scanning period and the average of the current horizontal scanning line and of a horizontal scanning line of the second preceding horizontal scanning period. Thus, for a current horizontal scanning line $l_5$, the horizontal scanning line $l_2'$ after the scanning line number conversion is represented by:

$$l_2' = \frac{1}{2}\left\{ l_3 + \frac{1}{2}(l_1 + l_5) \right\} \qquad (1)$$
$$= \frac{1}{4}(l_1 + 2l_3 + l_5)$$

Thus the horizontal scanning line $l_2'$, obtained by averaging the horizontal scanning line $l_3$ and the average of the horizontal scanning lines $l_1$ and $l_5$ is at the position of the line $l_3$ on the image plane. Similarly a horizontal scanning line $l_4'$ obtained by the scanning line number conversion based on the scanning lines $l_5$, $l_7$, $l_9$ is positioned at $l_7$ on the image plane.

Consequently the horizontal scanning lines obtained by the scanning line number conversion during the n-th field period are positioned on the image plane as shown in FIG. 5B, so that the horizontal scanning lines are equally distanced either in the field image or in the frame image, and the image is free from distortion in the vertical direction in the image plane.

The foregoing embodiment is limited to a television signal conversion apparatus for converting the HDTV signal into the NTSCTV signal, but the present invention is not limited to such embodiment and is applicable to any apparatus for conversion between the interlaced television signals of different numbers of scanning lines, such as from the HDTV signal to the PALTV signal, and there can be obtained equally distanced horizontal scanning lines both in the field image and in the frame image, as in the foregoing embodiment.

As explained in the foregoing, the present invention employs a scanning line number converting circuit adapted to alternately select, in every field period, a horizontal scanning line obtained by line number conversion of an even number of horizontal scanning lines, and a horizontal scanning line obtained by line number conversion of an odd number of horizontal scanning lines, thereby providing a television signal conversion apparatus capable of precise and stable scanning line number conversion, from a television signal with a larger number of horizontal scanning lines into another television signal with a smaller number of horizontal scanning lines, wherein said scanning lines are equally distanced on the image plane either in the field image or in the frame image so that the image is free from distortion in the vertical direction.

What is claimed is:

1. A television signal conversion apparatus for converting a first television signal into a second television signal with a fewer number of horizontal scanning lines than in said first television signal, comprising:

A) first horizontal scanning line signal forming means for forming a horizontal scanning line signal corresponding to the horizontal scanning line of the second television signal, by performing an average value operation processing using horizontal scanning line signals corresponding to the horizontal scanning lines of an even number positioned mutually close on the image plane, among the plural horizontal scanning lines of the first television signal;

B) second horizontal scanning line signal forming means for forming a horizontal scanning line signal corresponding to the horizontal scanning line of the second television signal, by using an average value operation processing using horizontal scanning line signals corresponding to the horizontal scanning lines of an odd number positioned mutually close on the image plane, among the plural horizontal scanning lines of the first television signal; and C) horizontal scanning line signal output means for alternately selecting and outputting, every vertical synchronization period, the horizontal scanning line signal released from said first horizontal scanning line signal forming means and that formed by said second horizontal scanning line signal forming means.

2. A television signal conversion apparatus for converting a first television signal into a second television signal with a fewer number of horizontal scanning lines than in said first television signal and an aspect ratio different from that of said first television signal, comprising:

A) first horizontal scanning line signal forming means for forming a horizontal scanning line signal corresponding to the horizontal scanning line of the second television signal, from horizontal scanning line signals corresponding to the horizontal scanning lines of an even number positioned mutually close on the image plane, among the plural horizontal scanning lines of the first television signal;

B) second horizontal scanning line signal forming means for forming a horizontal scanning line signal corresponding to the horizontal scanning line of the second television signal, from horizontal scanning line signals corresponding to the horizontal scanning lines of an odd number positioned mutually close on the image plane, among the plural horizontal scanning lines of the first television signal; and C) horizontal scanning line signal output means for alternately selecting and outputting, every vertical synchronization period, the horizontal scanning line signal released from said first horizontal scanning line signal forming means and that formed by said second horizontal scanning line signal forming means.

3. A television signal conversion apparatus for converting a first television signal into a second television signal with a fewer number of horizontal scanning lines than in said first television signal, comprising:

A) first horizontal scanning line signal forming means for forming a horizontal scanning line signal corresponding to the horizontal scanning line of the second television signal, from horizontal scanning line signals corresponding to the horizontal scanning lines of an even number positioned mutually close on the image plane, among the plural horizontal scanning lines of the first television signal, said first horizontal scanning line signal forming means including:

1) first signal delaying means for receiving the first television signal and delaying said received first television signal by a horizontal scanning period;
2) first adding means for receiving the first television signal and adding thus received first television signal and the first television signal delayed by a first horizontal scanning period by said first signal delaying means; and
3) first coefficient multiplying means for multiplying the signal provided by said first adding means, by a predetermined coefficient;

B) second horizontal scanning line signal forming means for forming a horizontal scanning line signal corresponding to the horizontal scanning line of the second television signal, from horizontal scanning line signals corresponding to the horizontal scanning lines of an odd number positioned mutually close on the image plane, among the plural horizontal scanning lines of the first television signal; and C) horizontal scanning line signal output means for alternately selecting and outputting every vertical synchronization period, the horizontal scanning line signal released from said first horizontal scanning line signal forming means and that formed by said second horizontal scanning line signal forming means.

4. An apparatus according to claim 3, wherein said second horizontal scanning line signal forming means includes:

a) second signal delaying means for receiving the first television signal delayed by a horizontal scanning period in said first signal delaying means, and delaying thus received first television signal by a horizontal scanning period;
b) second adding means for receiving the first television signal, and adding thus received first television signal and the first television signal delayed by a horizontal scanning period by said second signal delaying means;
c) second coefficient multiplying means for multiplying the signal, provided by said second adding means, by a predetermined coefficient;
d) third adding means for adding the television signal multiplied by the predetermined coefficient in said second coefficient multiplying means, and the first television signal delayed by a horizontal scanning period in said first signal delaying means; and
e) third coefficient multiplying means for multiplying the signal, provided by said third adding means, by a predetermined coefficient.

5. A television signal conversion apparatus for converting a first television signal into a second television signal with a fewer number of horizontal scanning lines than in said first television signal, comprising:

A) first horizontal scanning line signal forming means for forming a horizontal scanning line signal corresponding to the horizontal scanning line of the second television signal, from horizontal scanning line signals corresponding to the horizontal scanning lines of an even number positioned mutually close on the image plane, among the plural horizontal scanning lines of the first television signal;

B) second horizontal scanning line signal forming means for forming a horizontal scanning line signal corresponding to the horizontal scanning line of the second television signal, from horizontal scanning line signals corresponding to the horizontal scanning lines of an odd number positioned mutually close on the image plane, among the plural horizontal scanning lines of the first television signal;

C) horizontal scanning line signal output means for alternatively selecting and outputting, every vertical synchronization period, the horizontal scanning line signal released from said first horizontal scanning line signal forming means and that formed by said second horizontal scanning line signal forming means;

D) thinning-out processing means for applying a thinning-out processing to the plural horizontal scanning line signals constituting the television signal output from said horizontal scanning line signal output means; and E) time base correction means for correcting the time base of the plural horizontal scanning line signals constituting the television signal processed by said thinning-out processing means, in such a manner that each of said signals, corresponds to the horizontal scanning period corresponding to said second television signal.

6. A television signal conversion apparatus for converting a first television signal into a second television signal with a fewer number of horizontal scanning lines than in said first television signal, comprising:

A) horizontal scanning line number conversion means for forming and outputting, during a first field period, a horizontal scanning line signal corresponding to the horizontal scanning line of the second television signal, from horizontal scanning line signals corresponding to the horizontal scanning lines of an even number, positioned mutually close on the image plane, among the plural horizontal scanning lines of the first television signal, and, during a second field period, a horizontal scanning line signal corresponding to the horizontal scanning line of the second television signal, from horizontal scanning line signals corresponding to the horizontal scanning lines of an odd number, positioned mutually close on the image plane, among the plural horizontal scanning lines of the first television signal;

B) thinning-out processing means for applying a thinning-out processing to the plural horizontal scanning line signals constituting the television signal output from said horizontal scanning line number conversion means; and C) time base correction means for correcting the time base of the plural horizontal scanning line signals constituting the television signal processed by said thinning-out processing means, in such a manner that each of said signals corresponds to the horizontal scanning period corresponding to said second television signal.

7. An apparatus according to claim 6, wherein said second television signal has an aspect ratio different from that of said first television signal.

8. An apparatus according to claim 6, wherein said horizontal scanning line number conversion means includes:

a) first signal delaying means for receiving the first television signal and delaying thus received first television signal by a horizontal scanning period;

b) first adding means for receiving the first television signal, and adding thus received first television signal and the first television signal delayed by a horizontal scanning period in said first signal delaying means;

c) first coefficient multiplying means for multiplying the signal, provided by said first adding means, by a predetermined coefficient.

d) second signal delaying means for receiving the first television signal delayed by a horizontal scanning period in said first signal delaying means, and delaying thus received first television signal by a horizontal scanning period;

e) second adding means for receiving the first television signal, and adding thus received first television signal and the first television signal delayed by a horizontal scanning period in said second signal delaying means;

f) second coefficient multiplying means for multiplying the signal, provided by said second adding means, by a predetermined coefficient;

g) third adding means for adding the television signal, multiplied by the predetermined coefficient in said second coefficient multiplying means, and the first television signal delayed by a horizontal scanning period in said first signal delaying means;

h) third coefficient multiplying means for multiplying the signal, provided by said third adding means, by a predetermined coefficient; and i) signal output means for switching the signal from said first coefficient multiplying means and the signal from said third coefficient multiplying means in first and second field periods.

9. A horizontal scanning line number conversion apparatus for converting the number of horizontal scanning lines of a television signal to a smaller number, comprising:

A) first horizontal scanning line signal forming means for forming, by using an operation processing by using horizontal scanning line signals corresponding to the horizontal scanning lines of an even number in the television signal, a horizontal scanning line signal corresponding to the horizontal scanning lines of a number smaller than said even number;

B) second horizontal scanning line signal forming means for forming, by using an average value operation processing by using horizontal scanning line signals corresponding to the horizontal scanning lines of an odd number in the television signal, a horizontal scanning line signal corresponding to the horizontal scanning lines of a number smaller than said odd number; and C) horizontal scanning line signal output means for switching, every vertical synchronization period, the horizontal scanning line signal formed by said first horizontal scanning line signal forming means and that formed by said second horizontal scanning line signal forming means.

10. A horizontal scanning line number conversion apparatus for converting the number of horizontal scanning lines of a television signal to a smaller number, comprising:

A) first horizontal scanning line signal forming means for forming, from horizontal scanning line signals corresponding to the horizontal scanning lines of an even number in the television signal, a horizontal scanning line signal corresponding to the horizontal scanning lines of a number smaller than said even number, said first horizontal scanning line signal forming means including:

1) first signal delaying means for receiving the television signal, and delaying thus received television signal by a horizontal scanning period;

2) first adding means for receiving the television signal, and adding thus received television signal and the television signal delayed by a horizontal scanning period in said first signal delaying means; and 3) first coefficient multiplying means for multiplying the signal, provided by said first adding means, by a predetermined coefficient;

B) second horizontal scanning line signal forming means for forming, from horizontal scanning line signals corresponding to the horizontal scanning lines of an odd number in the television signal, a horizontal scanning line signal corresponding to the horizontal scanning lines of a number smaller than said odd number; and C) horizontal scanning line signal output means for switching every vertical synchronization period, the horizontal scanning line signal formed by said first horizontal scanning line signal forming means and that formed by said second horizontal scanning line signal forming means.

11. An apparatus according to claim 10, wherein said second horizontal scanning line signal forming means includes:

a) second signal delaying means for receiving the television signal delayed by a horizontal scanning period in said first signal delaying means, and delaying thus received television by a horizontal scanning period;

b) second adding means for receiving the television signal, and adding thus received television signal and the television signal delayed by a horizontal scanning period in said second signal delaying means;

c) second coefficient multiplying means for multiplying the signal, provided by said second adding means, by a predetermined coefficient;

d) third adding means for adding the television signal, multiplied by the predetermined coefficient in said second coefficient multiplying means, and the television signal delayed by a horizontal scanning period in said first signal delaying means; and e) third coefficient multiplying means for multiplying the signal, provided by said third adding means, by a predetermined coefficient.

12. A horizontal scanning line number conversion apparatus for converting the number of horizontal scanning lines of a television signal to a smaller number, comprising:

A) first horizontal scanning line signal forming means for forming, from horizontal scanning line signals corresponding to the horizontal scanning lines of an even number in the television signal, a horizontal scanning line signal corresponding to the horizontal scanning lines of a number smaller than said even number;

B) second horizontal scanning line signal forming means for forming, from horizontal scanning line signals corresponding to the horizontal scanning lines of an odd number in the television signal, a horizontal scanning line signal corresponding to the horizontal scanning lines of a number smaller than said odd number;

C) horizontal scanning line signal output means for switching, every vertical synchronization period, the horizontal scanning line signal formed by said first horizontal scanning line signal forming means and that formed by said second horizontal scanning line signal forming means;

D) thinning-out processing means for applying a thinning-out processing to the plural horizontal scanning line signals constituting the television signal formed by said horizontal scanning line signal output means; and E) time base correction means for respectively correcting the time base of the plural horizontal scanning line signals constituting the television signal processed by said thinning-out processing means.

* * * * *

UNITED STATES PATENT AND TRADEMARK OFFICE
CERTIFICATE OF CORRECTION

PATENT NO. : 5,343,299
DATED : August 30, 1994
INVENTOR(S) : Hisashi Ishikawa

It is certified that error appears in the above-identified patent and that said Letters Patent is hereby corrected as shown below:

Col. 1, line 66.  Delete "10".

Col. 2, line 21.  Change "$1_0$ and $1_2$" to -- $\ell_0$ and $\ell_2$ --.

Col. 2, line 23.  Change "$1_1\prime$" to -- $\ell_1\prime$ --.

Col. 2, line 24.  Change "$1_1\prime$" to -- $\ell_1\prime$ --.

Col. 2, line 25.  Change "$1_0$ and $1_2$" to -- $\ell_0$ and $\ell_2$ --.

Col. 2, line 26.  Change "$1_1$" to -- $\ell_1$ --.

Col. 2, line 27.  Change "$1_1$ and $1_3$" to -- $\ell_1$ and $\ell_3$ --.

Col. 2, line 28.  Change "$1_2$" to -- $\ell_2$ --.

Col. 3, line 64.  Change "invention and;" to -- invention; and --.

Col. 4, line 13.  Delete "1".

Col. 5, line 4.  Change "$1_1$" to -- $\ell_1$ --.

Col. 5, line 5.  Change "$1_1\prime$" to -- $\ell_1\prime$ --.

Col. 5, line 6.  Change "$1_0$ and $1_2$" to -- $\ell_0$ and $\ell_2$ --.

Col. 5, line 14.  Change "$1_5$" to -- $\ell_5$ --.

UNITED STATES PATENT AND TRADEMARK OFFICE
CERTIFICATE OF CORRECTION

PATENT NO. : 5,343,299

DATED : August 30, 1994

INVENTOR(S) : Hisashi Ishikawa

It is certified that error appears in the above-identified patent and that said Letters Patent is hereby corrected as shown below:

Col. 5, line 15.  Change "$1_2\prime$" to -- $\ell_2\prime$ --.

Signed and Sealed this

Tenth Day of January, 1995

Attest:

BRUCE LEHMAN

Attesting Officer

Commissioner of Patents and Trademarks